(12) United States Patent
Kosuge (10) Patent No.: US 8,665,660 B2
(45) Date of Patent: Mar. 4, 2014

(54) CLOCK HANDOFF CIRCUIT AND CLOCK HANDOFF METHOD

(75) Inventor: Shoji Kosuge, Kanagawa (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 13/463,224

(22) Filed: May 3, 2012

(65) Prior Publication Data

US 2012/0287743 A1    Nov. 15, 2012

(30) Foreign Application Priority Data

May 11, 2011   (JP) ................................ 2011-105992

(51) Int. Cl.
*G11C 8/00*   (2006.01)
*G11C 7/10*   (2006.01)

(52) U.S. Cl.
USPC ............... 365/230.05; 365/189.04; 365/233.1

(58) Field of Classification Search
USPC .................................................... 365/230.05
See application file for complete search history.

(56) References Cited

U.S. PATENT DOCUMENTS 6,405,269 B1 *   6/2002  Camilleri et al. ......... 365/189.07
8,510,503 B2 *   8/2013  Yagihashi ..................... 711/110

FOREIGN PATENT DOCUMENTS

| JP | 2004-140619 | 5/2004 |
| JP | 2008-148250 | 6/2008 |
| JP | 2009-218885 | 9/2009 |

* cited by examiner

*Primary Examiner* — Son Mai
(74) *Attorney, Agent, or Firm* — Frommer Lawrence & Haug LLP; William S. Frommer (57) ABSTRACT

A clock handoff circuit outputting data in synchronism with a first clock input thereto as output data in synchronism with a second clock, includes: a dual port RAM capable of performing writing and reading independently of each other; a write address control section controlling write addresses of the dual port RAM in which the input data is written; a blank address detecting section detecting blank addresses among the write addresses in which the input data is not written; and a read address conversion section converting the write addresses of the dual port RAM excluding the blank address into read addresses from which the output data are read out.

5 Claims, 10 Drawing Sheets

| FREQUENCY RATIO 5:4 | | BL_P | | | | |
|---|---|---|---|---|---|---|
| | | 0 | 1 | 2 | 3 | 4 |
| RCNT | 0 | 1 | 0 | 0 | 0 | 0 |
| | 1 | 2 | 2 | 1 | 1 | 1 |
| | 2 | 3 | 3 | 3 | 2 | 2 |
| | 3 | 4 | 4 | 4 | 4 | 3 |

FIG.6B

| FREQUENCY RATIO 6:4 | | BL_P | | | | | |
|---|---|---|---|---|---|---|---|
| | | 0,1 | 1,2 | 2,3 | 3,4 | 4,5 | 5,0 |
| RCNT | 0 | 2 | 0 | 0 | 0 | 0 | 1 |
| | 1 | 3 | 3 | 1 | 1 | 1 | 2 |
| | 2 | 4 | 4 | 4 | 2 | 2 | 3 |
| | 3 | 5 | 5 | 5 | 5 | 3 | 4 |

FIG.6C

| FREQUENCY RATIO 6:5 | | BL_P | | | | | |
|---|---|---|---|---|---|---|---|
| | | 0 | 1 | 2 | 3 | 4 | 5 |
| RCNT | 0 | 1 | 0 | 0 | 0 | 0 | 0 |
| | 1 | 2 | 2 | 1 | 1 | 1 | 1 |
| | 2 | 3 | 3 | 3 | 2 | 2 | 2 |
| | 3 | 4 | 4 | 4 | 4 | 3 | 3 |
| | 4 | 5 | 5 | 5 | 5 | 5 | 4 |

FIG.6D

| FREQUENCY RATIO 7:5 | | BL_P | | | | | | |
|---|---|---|---|---|---|---|---|---|
| | | 0,1 | 1,2 | 2,3 | 3,4 | 4,5 | 5,6 | 6,0 |
| RCNT | 0 | 2 | 0 | 0 | 0 | 0 | 0 | 1 |
| | 1 | 3 | 3 | 1 | 1 | 1 | 1 | 2 |
| | 2 | 4 | 4 | 4 | 2 | 2 | 2 | 3 |
| | 3 | 5 | 5 | 5 | 5 | 3 | 3 | 4 |
| | 4 | 6 | 6 | 6 | 6 | 6 | 4 | 5 |

FIG.6E

| FREQUENCY RATIO 7:4 | | BL_P | | | | | | |
|---|---|---|---|---|---|---|---|---|
| | | 0,1,2 | 1,2,3 | 2,3,4 | 3,4,5 | 4,5,6 | 5,6,0 | 6,0,1 |
| RCNT | 0 | 3 | 0 | 0 | 0 | 0 | 1 | 2 |
| | 1 | 4 | 4 | 1 | 1 | 1 | 2 | 3 |
| | 2 | 5 | 5 | 5 | 2 | 2 | 3 | 4 |
| | 3 | 6 | 6 | 6 | 6 | 3 | 4 | 5 |

CLOCK HANDOFF CIRCUIT AND CLOCK HANDOFF METHOD

FIELD

The present disclosure relates to a clock handoff circuit and a clock handoff method and, more particularly, to a clock handoff circuit and a clock handoff method for allowing clock handoff to be performed with higher stability.

BACKGROUND

There are clock handoff circuits according to the related art which convert input data in synchronism with a certain clock into data in synchronism with a different clock and output the converted data. In a clock handoff circuit, a comparison is carried out between the phases of write addresses and read addresses of a readable/writable dual port RAM (random access memory) to control the write addresses and read addresses such that no conflict occurs between them.

For example, there are clock handoff circuits which control write addresses based on a write frame pulse signal and control read addresses based on a read frame pulse signal having a phase different from the phase of the write address pulse signal (for example, see JP-A-2004-140619 (Patent Document 1)).

There are clock handoff circuits which monitor the phases of write addresses and read addresses. When the phases approach each other to leave a predetermined distance between them, the write addresses and read addresses are initialized such that a certain distance kept between them (for example, see JP-A-2009-218885 (Patent Document 2)).

There are proposed optical signal transmission systems which perform a process of destuffing a high-order transmission frame by comparing the phases of write addresses and read addresses of an FIFO (first-in first-out) memory using a phase comparator of a PLL (phase-locked loop) circuit to control the write addresses and the read addresses appropriately (for example, see JP-A-2008-148250 (Patent Document 3)).

SUMMARY

The technique disclosed in Patent document 1 is based on an assumption that there is no overlap between the phase of a write frame pulse signal and the phase of a read frame pulse signal. However, no means for making a setup for preventing such phases from overlapping each other is disclosed, and clock handoff cannot be performed with stability in practice.

According to the technique disclosed in Patent Document 2, even if circuit is operating with stability when the phases of write addresses and read addresses have become close to each other, the write addresses and the read addresses may be initialized due to clock fluctuations. Then, the validity of data subjected to clock handoff is not guaranteed.

In the case of destuffing of a high-order transmission frame disclosed in Patent Document 3, since the frequency of destuffing is low, even when a change occurs in the clock of the PLL circuit As a result of destuffing, the change is insignificant and will not affect the operation of the PLL circuit. However, when the technique disclosed in Patent Document 3 is applied to a clock handoff circuit, phase control information for controlling the phases of write addresses and read addresses is generated at a frequency higher than the frequency of destuffing. Therefore, if the phase control information includes an error, the operation of the PLL circuit will be affected. As a result, the PLL circuit performs clock resynchronization, and the operation of the PLL circuit can therefore become unstable, which can adversely affect a system provided downstream of the circuit.

Under the circumstance, it is desirable to allow clock handoff to be performed with higher stability.

An embodiment of the present disclosure is directed to a clock handoff circuit outputting data in synchronism with a first clock input thereto as output data in synchronism with a second clock. The circuit includes a dual port RAM capable of performing writing and reading independently of each other, a write address control section controlling write addresses of the dual port RAM in which the input data are written, a blank address detecting section detecting blank addresses among the write addresses in which the input data is not written, and a read address conversion section converting the write addresses of the dual port RAM excluding the blank address into read addresses from which the output data are read out.

The clock handoff circuit may further include a phase synchronization circuit establishing synchronization between the phase of the most significant bits of the write addresses and the phase of the most significant bits of the read addresses. The read address conversion section may invert the phase of the most significant bits of the read addresses synchronized with the phase of the most significant bits of the write addresses.

The frequency of the first clock may be higher than the frequency of the second clock, and the ratio of the frequency of the first clock to the frequency of the second frequency may be a ratio represented by integers.

The read address conversion section may convert the write addresses into the read addresses based on a table on which the blank addresses and the read addresses are associated according to the integral ratio.

Another embodiment of the present disclosure is directed to a clock handoff method executed by a clock handoff circuit outputting data in synchronism with a first clock input thereto as output data in synchronism with a second clock and including a dual port RAM capable of performing writing and reading independently of each other. The method includes: controlling write addresses of the dual port RAM in which the input data is written; detecting blank addresses among the write addresses in which the input data is not written; and converting the write addresses of the dual port RAM excluding the blank address into read addresses from which the output data are read out.

In the dual port RAM of the embodiment of the present disclosure, write addresses in which input data are written are controlled. Blank addresses among the write addresses in which no input data is written are detected. The write addresses of the dual port RAM excluding the blank addresses are converted into read addresses from which output data are to be read out.

According to the embodiments of the present disclosure, clock handoff can be carried out with improved stability.

DETAILED DESCRIPTION

An embodiment of the technique according to the present disclosure will now be described with reference to the drawings. The following items will be described in the order listed.

1. Clock Handoff Circuit According to the Related Art
2. Clock Handoff Circuit Utilizing Technique of the Present Disclosure
3. Specific Exemplary Configuration of Clock Handoff Circuit Utilizing the technique of the Present Disclosure <1. Clock Handoff Circuit According to the Related Art>

Figure 1:
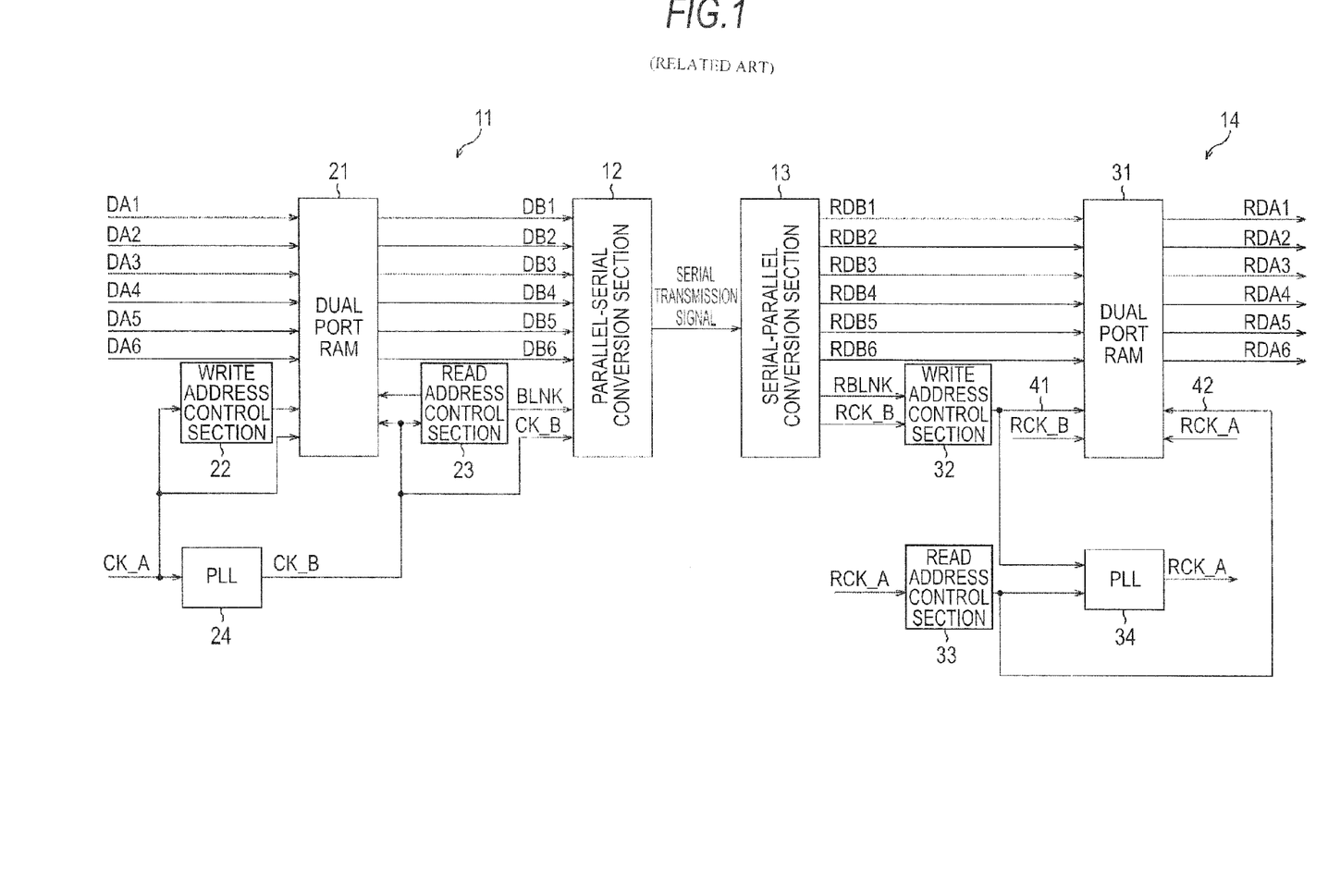
FIG. 1 is a diagram showing an exemplary configuration of data transmission system including a clock handoff circuit according to the related art.

FIG. 1 shows an exemplary configuration of a data transmission system including a clock handoff circuit according to the related art.

In the data transmission system 11 shown in FIG. 1, a data multiplexing apparatus 11 multiplexes data and supplies the resultant data to a parallel-serial conversion section 12. The parallel-serial conversion section 12 performs parallel-serial conversion of the multiplexed data supplied from the data multiplexing apparatus 11 and transmits the resultant data to a serial-parallel conversion section 13 as a serial transmission signal. The serial-parallel conversion section 13 performs serial-parallel conversion of the serial transmission signal transmitted from the parallel-serial conversion section 12 and supplies the resultant signal to a data separating apparatus 14. The data separating apparatus 14 separates the data supplied from the serial-parallel conversion section 13.

The data multiplexing apparatus 11 is configured as a clock handoff circuit. Pieces of input data DA1 to DA6 in synchronism with a write clock CK_A are written in a dual port RAM (random access memory) 21 of the data multiplexing apparatus 11, and pieces of output data DB1 to DB6 in synchronism with a read clock CK_B are read out from the dual port RAM 21.

A write address control section 22 controls the write addresses of the dual port RAM 21 in which the pieces of input data DA1 to DA6 are written. A read address control section 23 controls the read address of the dual port RAM 21 from which the pieces of output data DB1 to DB6 are read out. A PLL (phase-locked loop) circuit 24 outputs the read clock CK_B based on the write clock CK_A. The read clock CK_B is output at a frequency which is 5/4 times the frequency of the write clock CK_A. That is, the ratio of the frequency of the write clock CK_A to the frequency of the read clock CK_B is 4:5.

Figure 2:
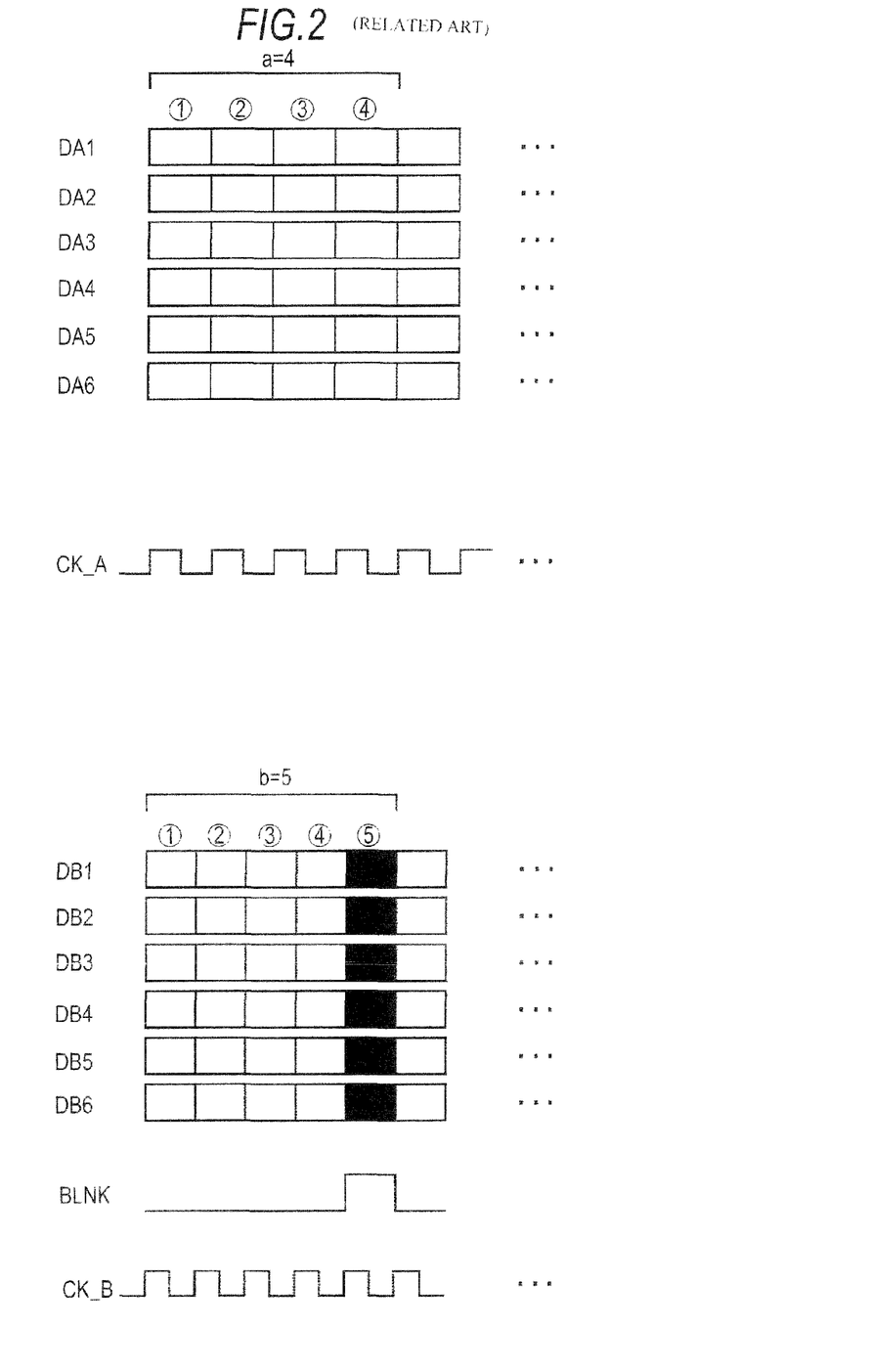
FIG. 2 is an illustration for explaining a method of multiplex data.

FIG. 2 is an illustration for explaining a data multiplexing method used by the data multiplexing apparatus 11.

As a result of a clock handoff operation of the data multiplexing apparatus 11, as shown in FIG. 2, the pieces of input data DA1 to DA6 which are associated with four clock periods of the write clock CK_A are read out as the pieces of output data DB1 to DB6 associated with five clock periods of the read clock CK_B.

The output data DB1 to DB6 associated with five clock periods of the read clock CK_B include pieces of empty data (referred to as blank data hereinafter) which are represented by black boxes in the figure.

The data multiplexing apparatus 11 can store new pieces of data in such regions of blank data to transmit the data to the data separating apparatus 14. A signal BLNK indicating the positions of blank data included in output data is generated by the read address control section 23, and the signal is transmitted to the data separating apparatus 14 along with the output data DB1 to DB6.

As thus described, the data multiplexing apparatus 11 can multiplex new data with data which have been input thereto by performing clock handoff, and the resultant data can be transmitted to the data separating apparatus 14.

The data separating apparatus 14 is also configured as a clock handoff circuit. Input data RDB1 to RDB6 (i.e., the data DB1 to DB6) in synchronism with a write clock RCK_B are written in a dual port RAM 31 of the data separating apparatus 14, and output data RDA1 to RDA6 (i.e., the data DA1 to DA6) in synchronism with a read clock RCK_A are read out from the dual port RAM 31.

A write address control section 32 controls the write addresses of the dual port RAM 31 in which the input data RDB1 to RDB6 are written. A read address control section 33 controls the read addresses of the dual port RAM 31 from which the output data RDA1 to RDA6 are read out. A PLL circuit 34 outputs the read clock RCK_A based on the write addresses and the read addresses. The read clock RCK_A is output at a frequency which is 4/5 times the frequency of the write clock RCK_B. That is, the ratio of the frequency of the write clock RCK_B to the frequency of the read clock RCK_A is 5:4.

Figure 3:
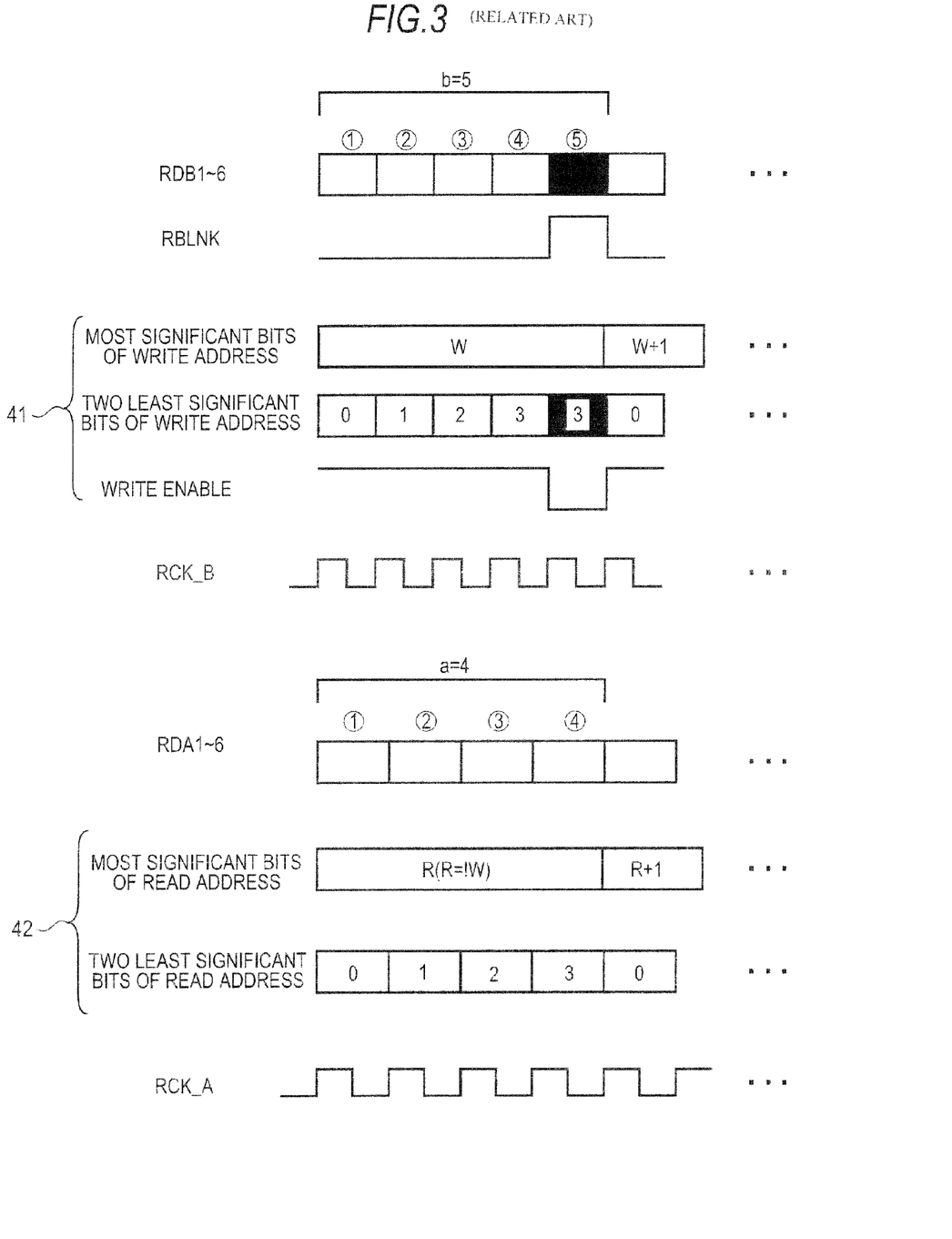
FIG. 3 is graphs for explaining a data separation method.

FIG. 3 is graphs for explaining a data separation method used by the data separating apparatus 14.

As a result of clock handoff performed by the data separating apparatus 14, as shown in FIG. 3, the input data RDB1 to RDB6 associated with five clock periods of the write clock RCK_B are read out as the output data RDA1 to RDA6 associated with four clock periods of the read clock RCK_A.

First, the write address control section 32 of the data separating apparatus 14 generates a write address control signal 41 (which may hereinafter be referred to as "write addresses 41") on the basis of a signal RBLNK indicating the positions of blank data of input data and the write clock RCK_B. As shown in FIG. 3, a write address 41 includes the most significant bits of the write address, the two least significant bits of the write address, and a write enable signal.

The read address control section 33 generates a read address control signal 42 (which may be referred to as "read address 42") on the basis of the read clock RCK_A output from the PLL circuit 34. A shown in FIG. 3, the read address 42 includes the most significant bits of the read address and the two least significant bits of the read address.

The read address control section 33 of the data separating apparatus 14 inputs read addresses whose most significant bits (R) are in a phase that is the inverse of the phase of the most significant bits of write addresses (W) to the PLL circuit, whereby the write addresses and the read addresses are controlled such that no overlapping will occur between them.

The write address control section 32 resets the two least significant bits of the write addresses to "0" according to the signal RBLNK. Thus, the phase of the signal RBLNK and the phase of the write addresses are synchronized, and a write enable signal is disabled to disallow blank data to be written in the dual port RAM 31.

As thus described, the data separating apparatus 14 performs clock handoff which allows input data including blank data to be output as output data including no blank data. When new pieces of data are multiplexed in regions of blank data, the new data can be separated from the input data based on the signal RBLNK.

However, since the signal RBLNK is transmitted as a serial transmission signal, when a transmission error occurs, the error can affect the operation of the PLL circuit 34. As a result, the read clock RCK_A output from the PLL circuit 34 may become discontinuous or undergo a change in the frequency thereof, which can affect the system downstream of the circuit.

A description will now be made on a clock handoff circuit according to the embodiment of the technique disclosed herein for achieving stable clock handoff.

<2. Clock Handoff Circuit Utilizing the Disclosed Technique>

[Exemplary Configuration of Clock Handoff Circuit]

Figure 4:
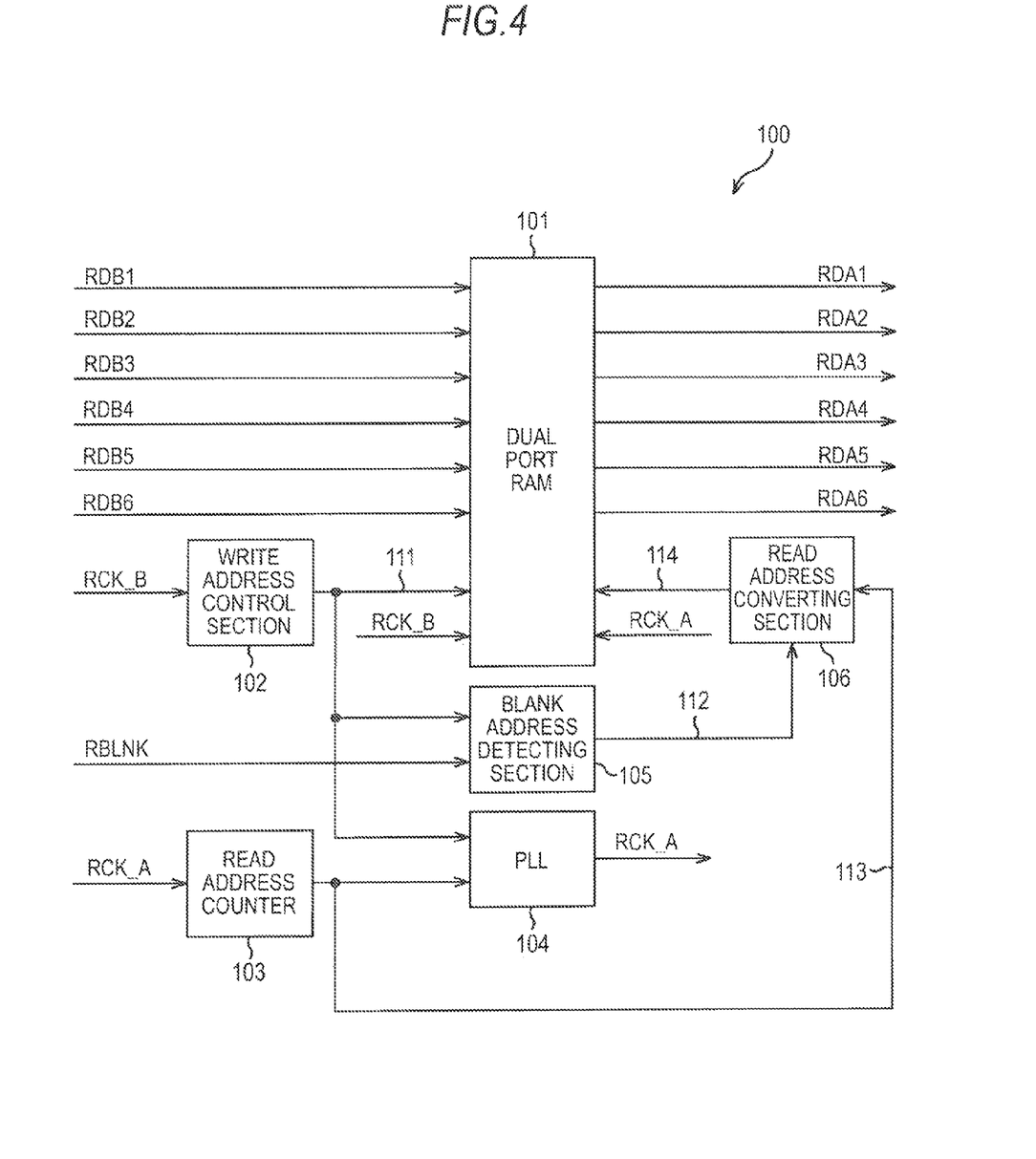
FIG. 4 is a diagram showing an exemplary configuration of a clock handoff circuit embodying the present disclosure.

FIG. 4 is a diagram showing an exemplary configuration of a clock handoff circuit 100 utilizing the technique disclosed herein, adapted to the above-described data separating apparatus 14.

The clock handoff circuit 100 shown in FIG. 4 includes a dual port RAM 101, a write address control section 102, a read address counter 103, a PLL circuit 104, a blank address detecting section 105, and a read address converting section 106.

The input data RDB1 to RDB6 in synchronism with the write clock RCK_B are written in the dual port RAM 101 of the clock handoff circuit 100, and the output data RDA1 to RDA6 in synchronism with the read clock RCK_A are read out from the dual port RAM 101.

The write address control section 102 controls the write addresses of the dual port RAM 101 in which the input data RDB1 to RDB6 are written. The read address counter 103 counts addresses from which data are read out based on the read clock RCK_A output from the PLL circuit 104.

The circuit PLL 104 outputs the read clock RCK_A based on the write addresses and the result of counting by the read address counter 103. The blank address detecting section 105 detects addresses among the write addresses where no input data is written (blank addresses) based on the write addresses and the signal RBLNK indicating the positions of blank data included in the input data.

The read address converting section 106 converts the write addresses of the dual port RAM 101 excluding the blank addresses detected by the blank address detecting section 105 into the read addresses from which the output data RDA1 to RDA6 are to be read.

The read clock RCK_A is output at a frequency which is 4/5 times the frequency of the write clock RCK_B. That is, the ratio of the frequency of the write clock RCK_B to the frequency of the read clock RCK_A is 5:4.

[Operations of Clock Handoff Circuit]

Operations of the clock handoff circuit 100 will now be described with reference to FIG. 5.

Figure 5:
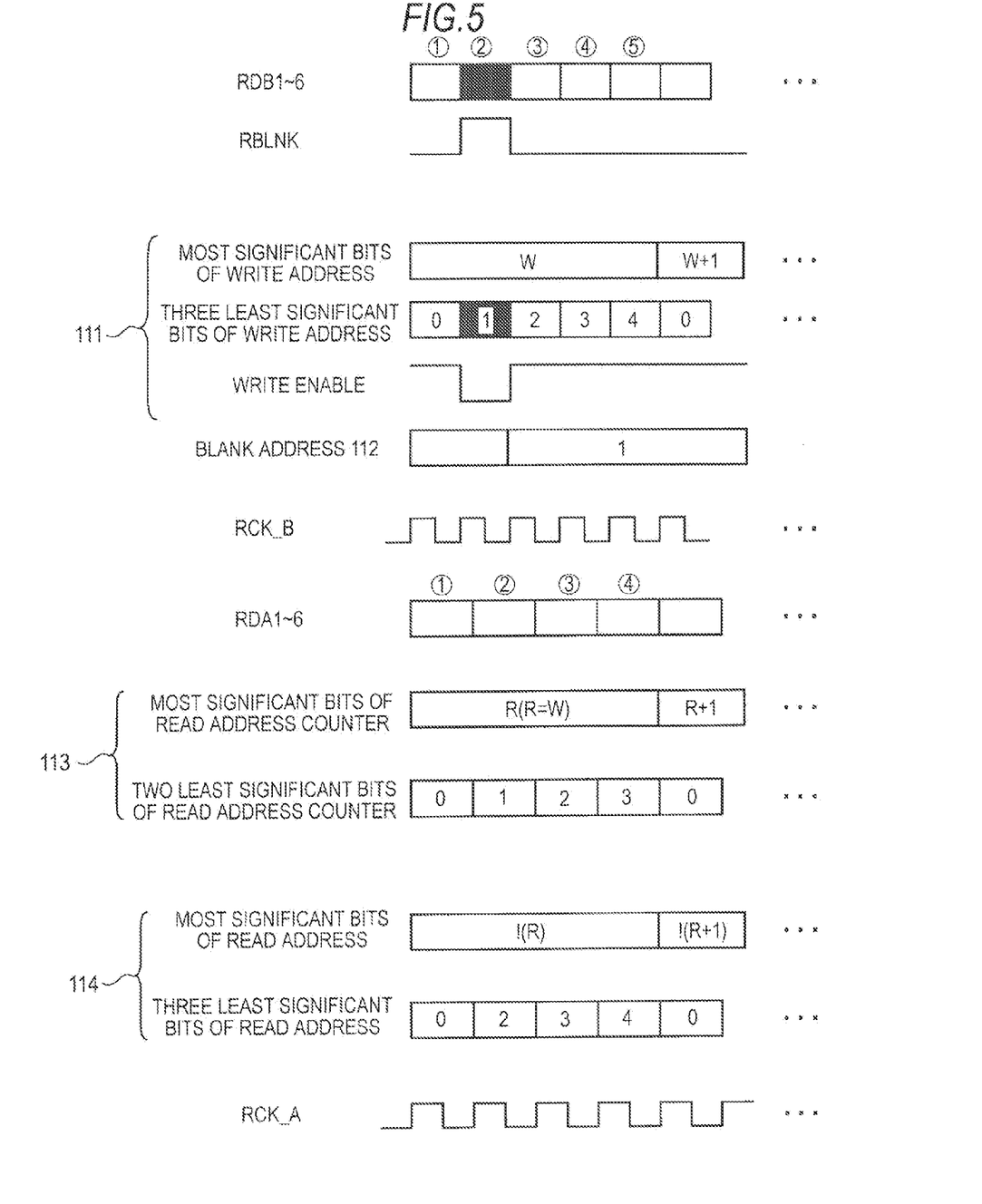
FIG. 5 is graphs for explaining operations of the clock handoff circuit.

As a result of a clock handoff operation of the clock handoff circuit 100, as shown in FIG. 5, the input data RDB1 to RDB6 which are associated with five clock periods of the write clock RCK_B are read out as the output data RDA1 to RDA6 which are associated with four clock periods of the read clock RCK_A. Among the input data RDB1 to RDB6 shown in FIG. 5, the pieces of data associated with the second clock periods of the clock are blank data.

First, the write address control section 102 of the clock handoff circuit 100 generates a write address control signal 111 (which may hereinafter be referred to as "write addresses 111") based on the write clock RCK_B. As shown in FIG. 5, a write address 111 includes the most significant bits of the write address and the two least significant bits of the write address, and a write enable signal.

The blank address detecting section 105 detects blank addresses based on the write addresses 111 and the signal RBLNK indicating the positions of the blank data among the pieces of input data and outputs a blank address signal 112 (which may hereinafter be referred to as "blank addresses 112") representing the blank addresses. The blank addresses 112 are kept unchanged since the system of the clock handoff circuit 100 is activated (the value of the addresses is "1" in the example shown in FIG. 5).

The read address counter 103 counts addresses from which data are read out based on the read clock RCK_A output from the PLL circuit 104 and outputs a read address counter signal 113 (which may hereinafter be referred to as "read address count 113"). As shown in FIG. 5, the read address count 113 includes the most significant bits of the read address count and the two least significant bits of the read address count.

The read address converting section 106 generates a read address control signal 114 (which may hereinafter be referred to as "read addresses 114") based on the information on the blank addresses 112 output from the blank address detecting section 105 and the read address count 113 output from the read address counter 103. As shown in FIG. 5, a read address 114, includes the most significant bits of the read address and the three least significant bits of the read address.

The write address control section 102 of the clock handoff circuit 100 operates in a free-run state regardless of the signal RBLK. That is, the signal RBLNK is prevented from affecting the operation of the PLL circuit 104.

The write address 111 shown in FIG. 5 is output at a period which is equivalent to five clock periods of the write clock. RCK_B, and the most significant bits of the write address are input to the phase comparator of the PLL circuit 104. The three least significant bits are not reset to "0" based on the signal RBLNK unlike the case shown in FIG. 3. The most significant bits of the read address count of the read address count 113 are input to the phase comparator of the PLL circuit 104 at a period which is equivalent to four clock periods of the read clock RCK_A. As a result, phase synchronization is achieved between the most significant bits of the write addresses and the most significant bits of the read addresses.

The blank address detecting section 105 of the clock handoff circuit 100 holds the three least significant bits of the write addresses (which are "1" in the example shown in FIG. 5) when the signal RBLNK becomes "1" as shown in FIG. 5 (or when blank data are written) and outputs the data as blank addresses 112. The read address converting section 106 outputs the three least significant bits of the read addresses based on a conversion table on which the three least significant bits of the read addresses are associated with the blank addresses 112 and the two least significant bits of the read address counts.

FIGS. 6A to 6E show exemplary conversion tables.

Figure 6A:
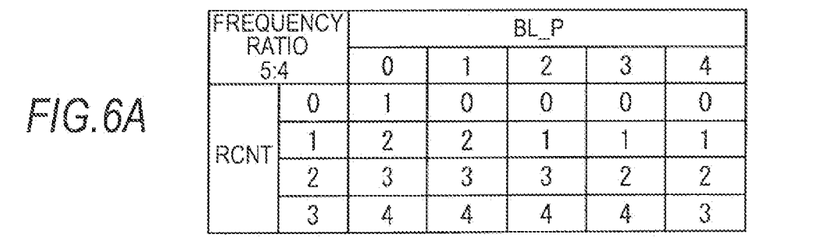
FIGS. 6A to 6E are conversion tables associated with frequency ratios.
Figure 6B:
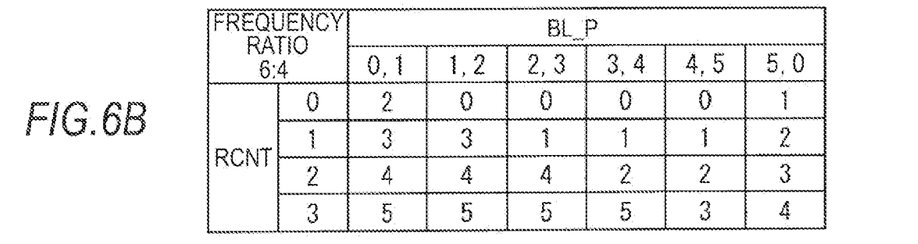
Figure 6C:
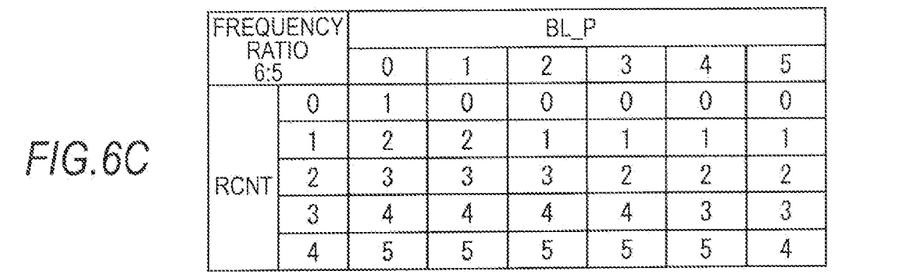
Figure 6D:
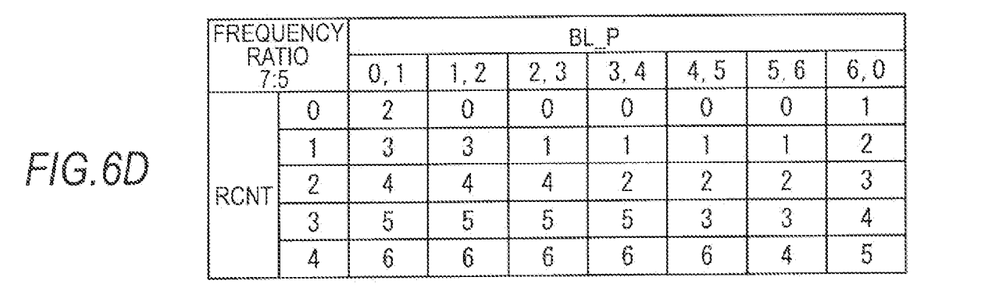
Figure 6E:
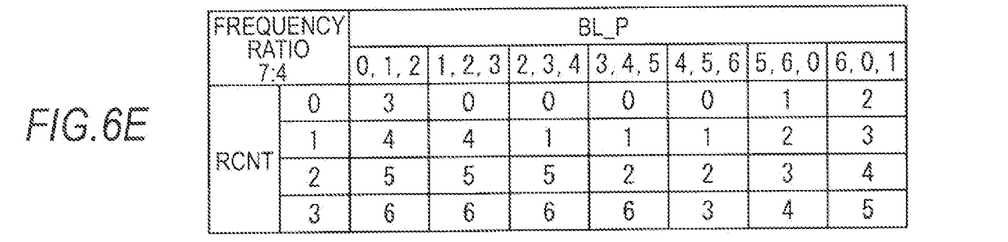

The conversion tables are provided in association with respective ratios of the frequency of the write clock RCK_B to the frequency of the read clock RCK_A (the ratios may hereinafter be referred to as "frequency ratios"). Specifically, FIG. 6A is a conversion table in the case of a frequency ratio of 5:4. FIG. 6B is a conversion table in the case of a frequency ratio of 6:4. FIG. 6C is a conversion table in the case of a frequency ratio of 6:5. FIG. 6D is a conversion table in the case of a frequency ratio of 7:5. FIG. 6E is a conversion table in the case of a frequency ratio of 7:4.

In FIGS. 6A to 6E, the reference characters "BL_P" represent blank addresses, and the reference characters "RCNT" represent the two least significant bits of read address counts in FIGS. 6A, 6B, and 6E and represent the three least significant bits of read address counts in FIGS. 6C and 6D.

In the example shown in FIG. 5, a frequency ratio as described above is set at 5:4, and the value of the blank addresses BL_P is "1". For example, in the case of a read address count RCNT whose two least significant bits have a value of "2", "3" is output as the value of the three least significant bits of the read address according to the conversion table shown in FIG. 6A.

The conversion tables are prepared such that a write address associated with a signal RBLNK having a value of "1" will not become an address to be read. As a result, blank data written in write addresses will not be read out, and it is therefore possible to fix the phase of read addresses with respect to the phase of write addresses.

As shown in FIG. 5, the read address converting section 106 inverts the phase of the most significant bits of read address counts of the read address count 113 input to the phase comparator of the PLL circuit 104 and outputs the resultant bits to as the most significant bits of addresses 114 to be read. Thus, control is exercised such that no overlapping occurs between write addresses and read addresses.

[Clock Handoff Process]

Figure 7:
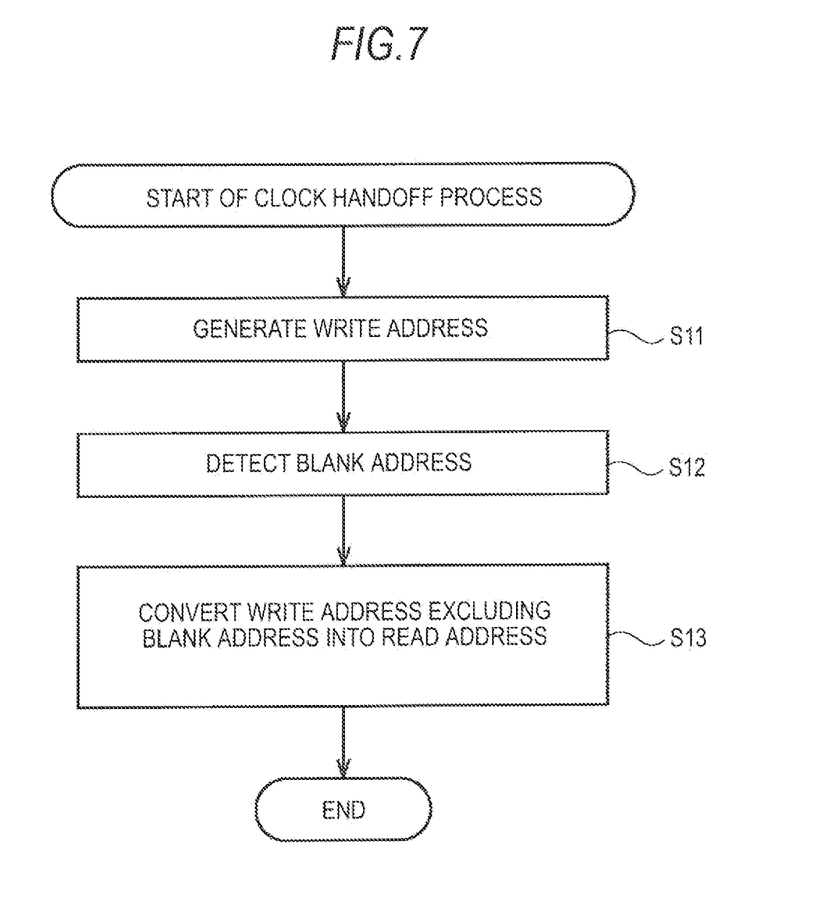
FIG. 7 is a flow chart for explaining a clock handoff process.

The clock handoff process performed by the clock handoff circuit 100 will now be described with reference to the flow chart shown in FIG. 7.

At step S11, the write address control section 102 generated write addresses 111 based on the write clock RCK_B.

At step S12, the blank address detecting section 105 detects blank addresses based on the write addresses 111 and the signal RBLNK and outputs the addresses thus detected as blank addresses 112.

At step S13, the write addresses 111 excluding the blank addresses are converted into read addresses 114 based on the information of the blank addresses 112 supplied from the blank address detecting section 105 and read address counts 113 output from the read address counter 103.

In the above-described configuration and process, the signal RBLNK does not affect the operation of the PLL circuit, and write addresses and read addresses can be prevented from overlapping each other. Thus, clock handoff can be carried out with higher stability.

<3. Specific Exemplary Configuration of Clock Handoff Circuit Utilizing the Disclosed Technique>

Figure 8:
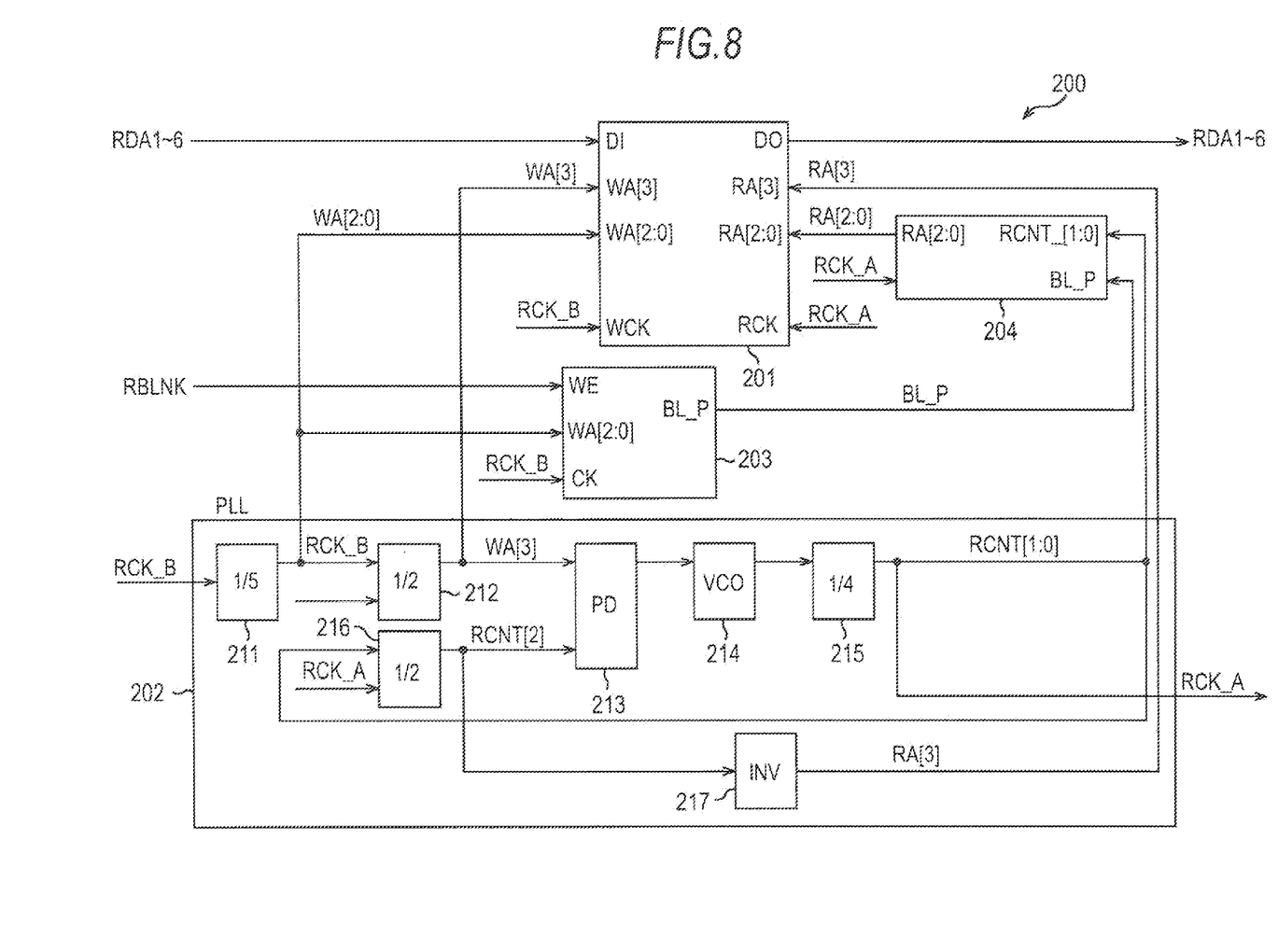
FIG. 8 is a diagram showing a specific exemplary configuration of a clock handoff circuit embodying the technique of the present disclosure.

FIG. 8 is a diagram showing a specific exemplary configuration of a clock handoff circuit utilizing the technique disclosed herein.

The clock handoff circuit 200 shown in FIG. 8 includes a dual port RAM 201, a PLL circuit 202, a blank address detecting section 203, and a read address converting section 204.

The dual port RAM 201, the blank address detecting section 203, and the read address converting section 204 of the clock handoff circuit 200 shown in FIG. 8 will not be described in detail because they correspond to the dual port RAM 101, the blank address detecting section 105, and the read address converting section 106 of the clock handoff circuit 100 shown in FIG. 4 respectively and have the same functions and configurations as those of the respective sections of the clock handoff circuit 100.

The PLL circuit 202 of the clock handoff circuit 200 shown in FIG. 8 corresponds to the write address control section 102, the read address counter 103, and the PLL circuit 104 of the clock handoff circuit 100 shown in FIG. 4.

The PLL circuit 202 includes frequency dividers 211 and 212, a phase comparator 213, a voltage-controlled oscillator (VOC) 214, frequency dividers 215 and 216, and an inverter 217:

The frequency divider 211 divides the frequency of a signal input thereto by 5, and the frequency divider 212 divides the frequency of a signal input thereto by 2. The phase comparator 213 converts a difference between the phases of two signals input thereto into a voltage and outputs the voltage. The VCO 214 controls the frequency of a signal output thereby according to the voltage of a signal input thereto. The frequency divider 215 divides the frequency of a signal input thereto by 4, and the frequency divider 216 devices the frequency of a signal input thereto by 2. The inverter 217 inverts a signal input thereto and outputs the inverted signal.

The read clock RCK_A is output at a frequency which is 4/5 times the frequency of the write clock RCK_B also in the configuration shown in FIG. 8. That is, the ratio of the frequency of the write clock RCK_B to the frequency of the read clock RCK_A (frequency ratio) is 5:4.

Figure 9:
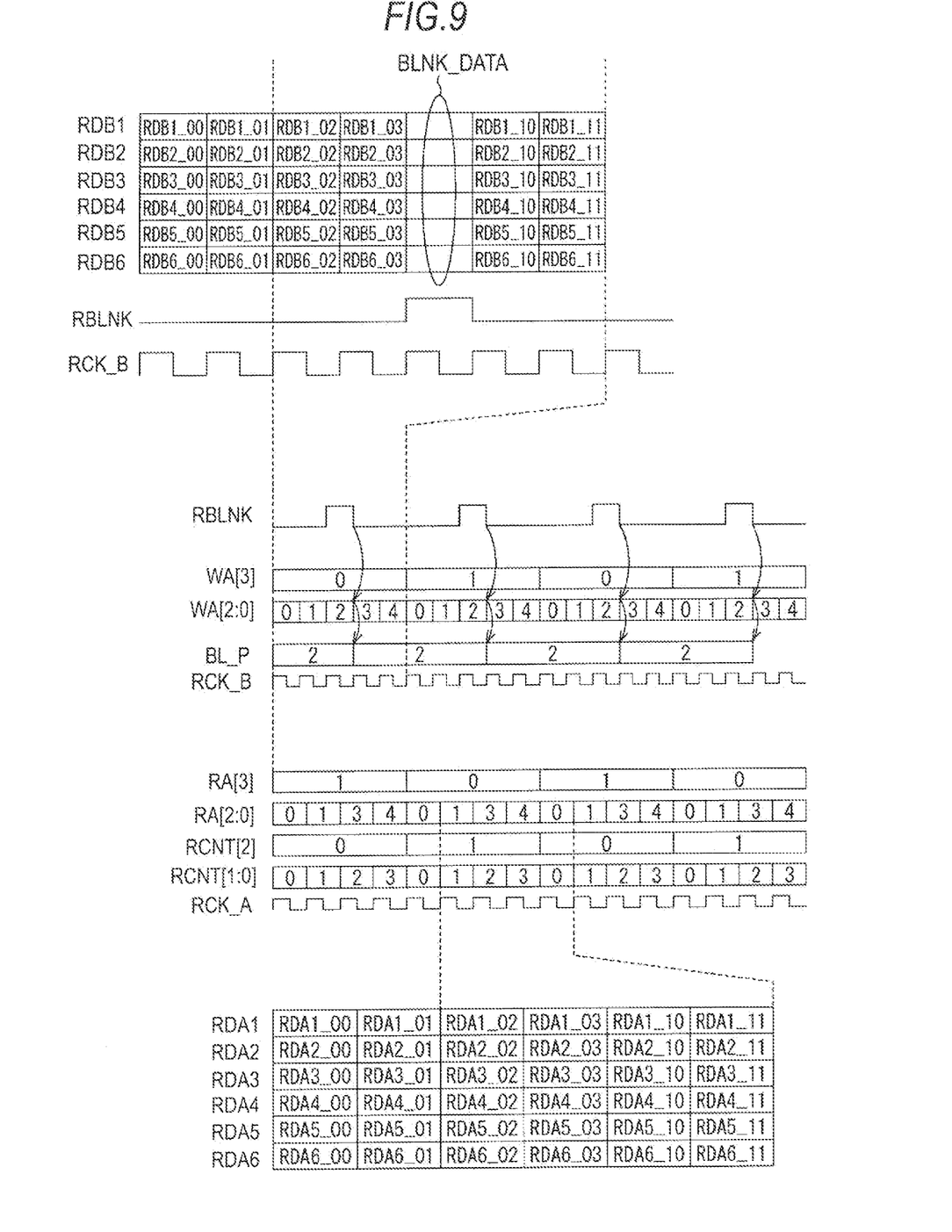
FIG. 9 is graphs for explaining a clock handoff method.

Operations of the clock handoff circuit 200 will now be described with reference to FIGS. 8 and 9.

Input data RDB1 to RDB6 are written in the dual port RAM 201 in synchronism with the write clock RCK_B. The input data RDB1 to RDB6 include blank data BLNK_DATA which appear once per five clock periods of the write clock RCK_B. Temporal positions of the blank data BLNK_DATA are identified by a signal RBLNK.

The frequency divider 211 counts the input signal using a frequency obtained by dividing the frequency of the write clock RCK_B by 5 to output write addresses WA[2:0]. The reference characters/numerals "WA[2:0]" indicate that the output is a signal representing 0th to 2nd bits of write addresses WA, and similar reference characters/numerals in the following description will have similar meanings.

The frequency divider 212 divides the frequency of the write address WA[2:0] supplied from the frequency divider 211 by 2 to output write addresses WA[3]. The write addresses WA[3] are input to the dual port RAM 201 and the phase comparator 213.

As thus described, the write addresses WA[3] and the write addresses WA[2:0] are input to the dual port RAM 201 as the most significant bits of write addresses and the least significant bits of the write addresses, respectively.

The blank address detecting section 203 detects blank addresses (which have a value "2" in the example shown in FIG. 9) by latching pieces of data among the write addresses WA[2:0] associated with the position of the blank data BLNK_DATA which is identified by a signal RBLNK, and the section outputs a blank address signal BL_P. As shown in FIG. 9, the blank address signal BL_P does not change with time.

The VCO 214 outputs a signal having a frequency according to the voltage of the output from the phase comparator 213. The frequency divider 215 counts the signal using a frequency obtained by dividing the frequency of the output from the VCO 214 by 4 to output a read address counter signal RCNT[1:0]. The frequency divider 216 divides the frequency of the read address counter signal RCNT[1:0] from the frequency divider 215 by 2 and outputs the resultant signal as a read address counter signal RCNT[2]. The inverter 217 inverts the read address counter signal RCNT[2] supplied from the frequency divider 216 to obtain read addresses RA[3] and inputs the addresses to the dual port RAM 201.

As thus described, the PLL circuit 202 outputs a read clock RCK_A having a frequency which is 4/5 times the frequency of the write clock RCK_B.

The input data RDB1 to RDB6 including the blank data. BLNK_DATA are written in the dual port RAM 201 in the writing phase of the operation. Meanwhile, it is required to prevent the blank data BLNK_DATA from being read out in the reading phase of the operation.

For this reason, the read address converting section 204 generates read addresses RA[2:0] including no blank address based on the blank address signal BL_P and the read address counter signal RCNT[1:0] and inputs the read addresses to the dual port RAM 201.

Specifically, the read address converting section 204 performs the operation as described below using the conversion table shown in FIG. 6A. For example, let us assume that the read address counter signal RCNT[1:0] changes to sequentially take values "0", "1", "2", and "3" in the order listed when the blank address signal BL_P has a value of "2". Then, values "0", "1", "3", and "4" excluding the value "2" are output, as the read addresses RA[2:0].

A thus described, the read addresses RA[3] and the read addresses RA[2:0] are input to the dual port RAM 201 as the most significant bits of the read addresses and the least significant bits of the read address, respectively.

The read address counter signal RCNT[2] from the frequency divider 216 is inverted by the inverter 217 and input the dual port RAM 201 as the read addresses RA[3]. Thus, the write addresses WA[3] which are the most significant addresses where data are written and the read addresses RA[3] which are the most significant addresses where data are read are controlled by the PLL circuit 202 such that a phase distance between those addresses will be maximized. The operation of the PLL circuit 202 relies only on the frequency division performed on the write clock RCK_B and the read clock RCK_A, and the signal input to the phase comparator 213 is not affected by a transmission error of the signal RBLNK which is transmitted as a serial transmission signal. Thus, the read clock RCK_A can be output with stability.

As a result of the above-described operations, the amounts of delays (phases) of the input data RDB1 to RDB6 are determined by the value of the blank address signal BL_P, the amounts being determined in units which are the read clock RCK_A divided by five. The input data are read out as output data RDA1 to RDA6.

Figure 10:
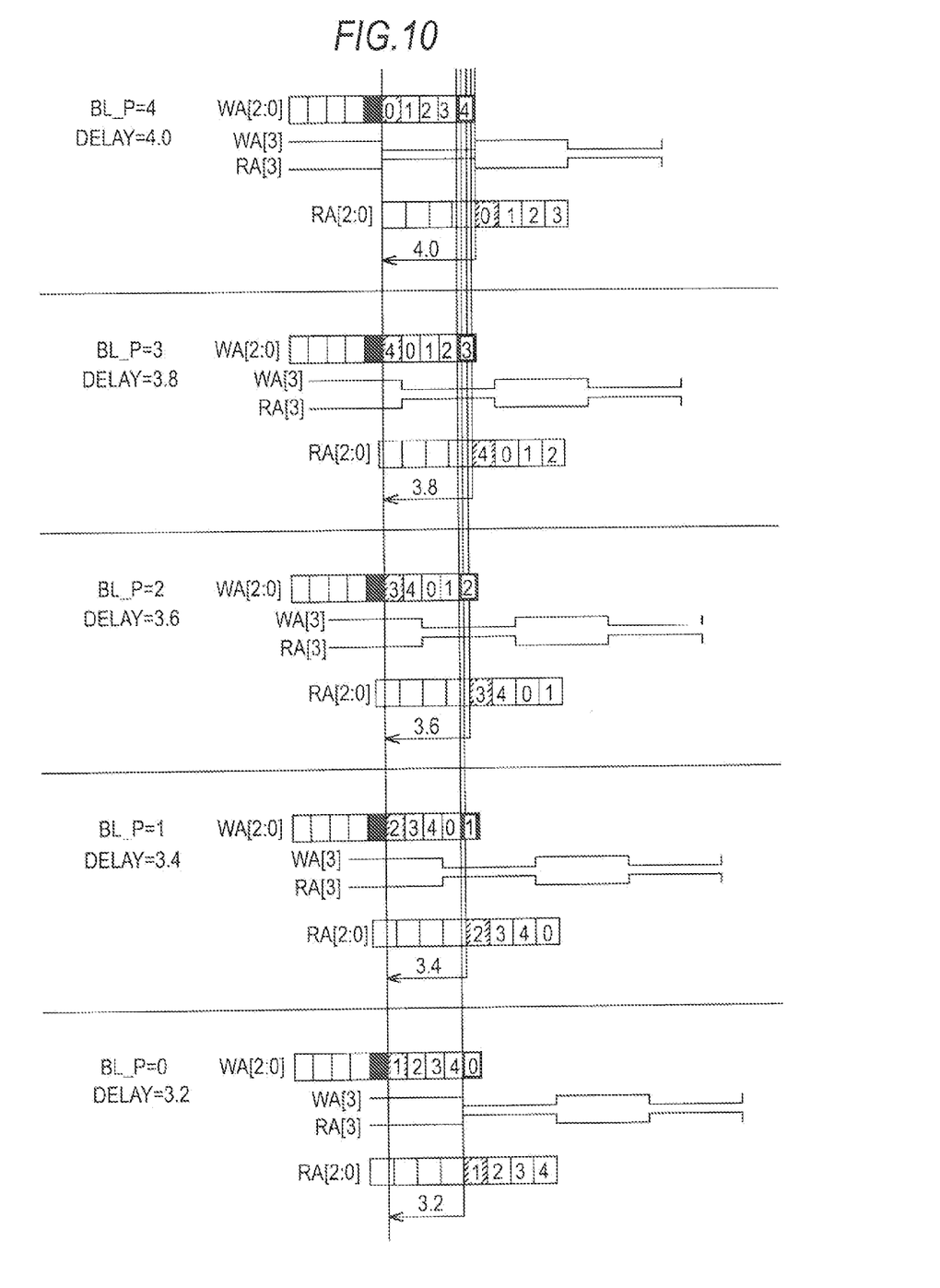
FIG. 10 is graphs for explaining delays of output data which are associated with blank addresses.

FIG. 10 is graphs for explaining delays of output data which are associated with values of the blank address signal BL_P.

FIG. 10 shows the amounts of delays of output data observed in association various values of the blank address signal BL_P, i.e., values "4", "3", "2", "1", and "0" which are listed in the top-to-bottom direction of the figure. It is assumed that the ratio of the frequency of the write clock RCK_B to the frequency of the read clock RCK_A is 5:4.

When the value of the blank address signal BL_P is 4, the reading of a value "0" from the read addresses RA[2:0] delays from the writing of the value "0" in the write addresses WA[2:0] by an amount equivalent to 4.0 clock periods of the read clock RCK_A.

When the value of the blank address signal BL_P is 3, the reading of a value "4" from the read addresses RA[2:0] delays from the writing of the value "4" in the write addresses WA[2:0] by an amount equivalent to 3.8 clock periods of the read clock RCK_A.

When the value of the blank address signal BL_P is 2, the reading of a value "3" from the read addresses RA[2:0] delays from the writing of the value "3" in the write addresses WA[2:0] by an amount equivalent to 3.6 clock periods of the read clock RCK_A.

When the value of the blank address signal BL_P is 1, the reading of a value "2" from the read addresses RA[2:0] delays from the writing of the value "2" in the write addresses WA[2:0] by an amount equivalent to 3.4 clock periods of the read clock RCK_A.

When the value of the blank address signal BL_P is 0, the reading of a value "1" from the read addresses RA[2:0] delays from the writing of the value "1" in the write addresses WA[2:0] by an amount equivalent to 3.2 clock periods of the read clock RCK_A.

As shown in FIG. 10, when the phase of the write addresses. WA[3] and the phase of the read addresses RA[3] are synchronized by the PLL circuit 202, a delay as thus described is always kept constant according to the value of the blank address signal BL_P.

Even when the clock handoff circuit 20.0 as a whole including the PLL circuit 202 is re-started, variation of a delay stays within a range equivalent to 0.8 clock periods of the read clock RCK_A, and the amount of the delay cart therefore, be estimated with accuracy of 0.2 clock periods.

A description has been made above on a clock handoff operation performed when the ratio of the frequency of the write clock RCK_B to the frequency of the read clock RCK_A is 5:4. The technique disclosed herein can be applied to cases wherein the frequency of the write clock RCK_B is higher than the frequency of the read clock RCK_A and wherein the frequency ratio can be simply expressed by integers.

The technique disclosed herein is not limited to the above-described embodiment, and various changes may be made to the embodiment without departing the spirit of the present disclosure.

The technique disclosed herein may be implemented in the following alternative configurations.

(1) A clock handoff circuit outputting data in synchronism with a first clock input thereto as output data in synchronism with a second clock, the circuit including:

a dual port RAM capable of performing writing and reading independently of each other;

a write address control section controlling write addresses of the dual port RAM in which the input data is written;

a blank address detecting section detecting blank addresses among the write addresses in which the input data is not written; and a read address conversion section converting the write addresses of the dual port RAM excluding the blank address into read addresses from which the output data are readout.

(2) The clock handoff circuit according to the item (1), further including a phase synchronization circuit establishing synchronization between the phase of significant bits of the write addresses and the phase of significant bits of the read addresses. The read address conversion section may invert the phase of the significant bits of the read addresses synchronized with the phase of the significant bits of the write addresses.

(3) The clock handoff circuit according to the item (1) or (2), wherein the frequency of the first clock is higher than the frequency of the second clock, and the ratio of the frequency of the first clock to the frequency of the second frequency is a ratio represented by integers.

(4) The clock handoff circuit according to the item (3), wherein the read address conversion section converts the write addresses into the read addresses based on a table on which the blank addresses and the read addresses are associated according to the integral ratio.

(5) A clock handoff method executed by a clock handoff circuit outputting data in synchronism with a first clock input thereto as output data in synchronism with a second clock and including a dual port RAM capable of performing writing and reading independently of each other, the method including:
   controlling write addresses of the dualport RAM in which the input data is written;
   detecting blank addresses among the write addresses in which the input data is not written; and
   converting the write addresses of the dual port RAM excluding the blank address into read addresses from which the output data are read out.

The present disclosure contains subject matter related to that disclosed in Japanese Priority Patent Application JP 2011-105992 filed in the Japan Patent Office on May 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A clock handoff circuit outputting data in synchronism with a first clock input thereto as output data in synchronism with a second clock, the circuit comprising:
   a dual port RAM capable of performing writing and reading independently of each other;
   a write address control section controlling write addresses of the dual port RAM in which the input data is written;
   a blank address detecting section detecting blank addresses among the write addresses in which the input data is not written; and
   a read address conversion section converting the write addresses of the dual port RAM excluding the blank address into read addresses from which the output data are read out.

2. The clock handoff circuit according to claim 1, further comprising:
   a phase synchronization circuit establishing synchronization between the phase of the most significant bits of the write addresses and the phase of the most significant bits of the read addresses, wherein
   the read address conversion section inverts the phase of the most significant bits of the read addresses synchronized with the phase of the most significant bits of the write addresses.

3. The clock handoff circuit according to claim 1, wherein the frequency of the first clock is higher than the frequency of the second clock and wherein the ratio of the frequency of the first clock to the frequency of the second frequency is a ratio represented by integers.

4. The clock handoff circuit according to claim 3, wherein the read address conversion section converts the write addresses into the read addresses based on a table on which the blank addresses and the read addresses are associated according to the integral ratio.

5. A clock handoff method executed by a clock handoff circuit outputting data in synchronism with a first clock input thereto as output data in synchronism with a second clock and including a dual port RAM capable of performing writing and reading independently of each other, the method comprising:
   controlling write addresses of the dual port RAM in which the input data is written;
   detecting blank addresses among the write addresses in which the input data is not written; and
   converting the write addresses of the dual port RAM excluding the blank address into read addresses from which the output data are read out.

* * * * *